Dec. 20, 1932. W. S. SEARLES 1,891,653
OPHTHALMIC MOUNTING
Filed April 25, 1932
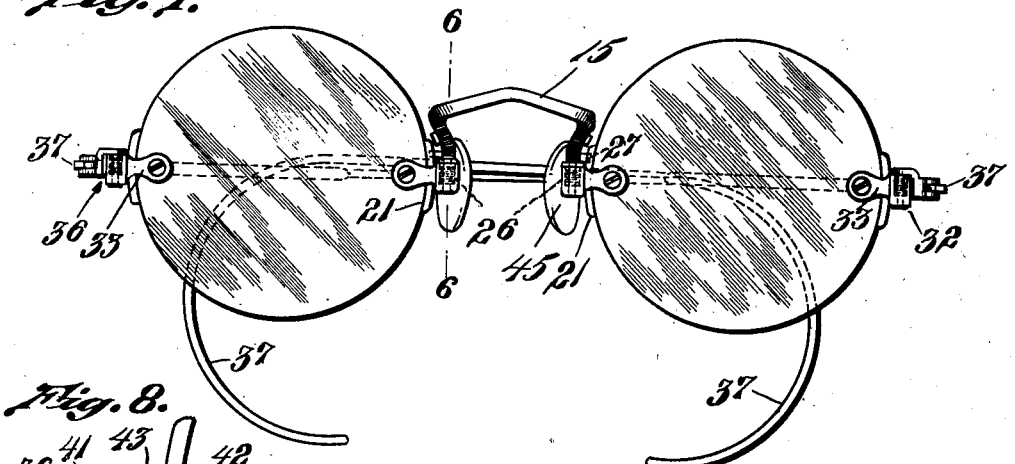
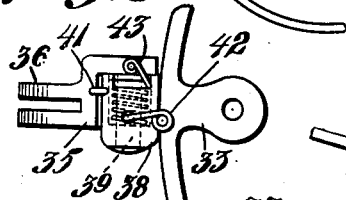
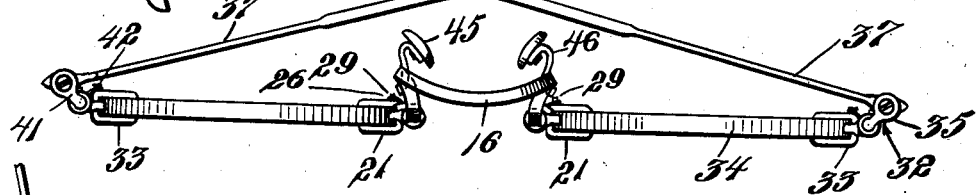
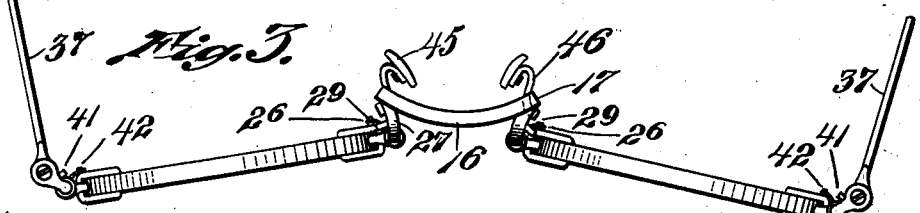
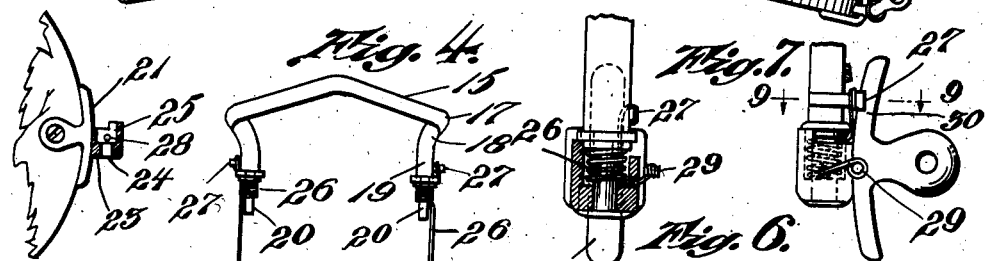
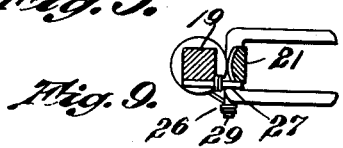
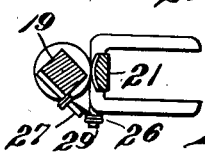
INVENTOR.
Wayne S. Searles
BY Barlow & Barlow
ATTORNEYS.

Patented Dec. 20, 1932

1,891,653

UNITED STATES PATENT OFFICE

WAYNE S. SEARLES, OF PROVIDENCE, RHODE ISLAND, ASSIGNOR TO UNIVERSAL OPTICAL CORPORATION, A CORPORATION OF RHODE ISLAND

OPHTHALMIC MOUNTING

Application filed April 25, 1932. Serial No. 607,378.

This invention relates to an ophthalmic mounting and has for one of its objects to provide a fixed pupiliary distance of the lenses in a mounting having flexibility in a horizontal plane.

Another object of the invention is the provision of means which will permit relative outward swinging movement of the lenses in a horizontal plane and which will prevent any movement in a vertical plane, thus maintaining the proper alignment of the lenses and preventing them from what is known as "sagging".

Another object of the invention is the provision of a construction which, although allowing flexing movement of the lenses in a horizontal plane, will maintain the nose pads in fixed relation to prevent the mounting from setting lower on the nose than desired.

Another object of the invention is to avoid the danger of breaking the lenses in handling them incident to removal or placing them in working position.

Another object of the invention is the provision of means for absorbing the strains which ordinarily occur in taking the mounting from the face of the wearer, which usually tends to flex the lenses outwardly from their normal plane when in position on the face of the wearer.

Another object of the invention is to prevent breaking of the lenses or their mounting at the bridge connection by providing means permitting movement of the lenses at this point to absorb strains tending to move the lenses from the plane of working position.

Another object of the invention is to prevent the lenses or parts of the mounting from breaking at the point of the temple connection by providing a means to permit movement of the temples outwardly beyond the usual 90° angle by means of a swivel mounting to permit bodily swinging of the temple hinge.

A further object of the invention is the provision of constructions for obtaining these objects in a simple manner by which the advantageous results may be attained in an inexpensive construction.

With these and other objects in view, the invention consists of certain novel features of construction, as will be more fully described, and particularly pointed out in the appended claims.

In the accompanying drawing:

Fig. 1 is a face view of the rimless mounting with the temples folded across the same in inoperative position and embodying the invention herein disclosed.

Fig. 2 is a top plan view thereof with the lenses in aligned normal position.

Fig. 3 shows the parts swung about their swivel mounting as would often occur in the removal of the mounting from the face of the wearer.

Fig. 4 is a front elevation of the bridge with the bearing posts and springs mounted thereon.

Fig. 5 is a fragmental view of a portion of the lens with the straps secured thereto and showing the socket for receiving the post bearing in section.

Fig. 6 is a sectional view of the assembly of these parts looking in the direction at right angles to that shown in Figs. 4 and 5.

Fig. 7 is a side elevation of the assembly showing the connections of the spring in operating position.

Fig. 8 is a side elevation of the end piece.

Figs. 9 and 10 are sectional views on substantially line 9—9 of Fig. 7 showing the stop in engaged and disengaged position.

When removing spectacles from the face, it is frequent to grasp the temples and spread them laterally in a direction away from the head to disconnect them from back of the ears which flexes the temples and tends to flex the mount outwardly through the temples which are limited in their outward swinging movement to a position at substantially right angles to the plane of the lenses. In a rigid bridge with rigidly connected lenses, this action frequently causes breaking of the mounting and the lenses, and in order to avoid this frequent occurrence there has been an attempt made to provide some flexibility at or in the bridge, but due to frequent flexing of this bridge the same becomes weakened and either allows twisting to permit the lenses to get out of alignment or allows the nose pads which are attached thereto spread and permit the mounting to settle to a lower position on the nose and thus become out of position. Further, any attempt to connect the lenses to the bridge through a resilient arm permits twisting as well as movement in a vertical plane and consequently all this type of movable structures are looked upon by the oculist with some disfavor. Accordingly, to avoid all of these disadvantages present and provide a flexible mounting which will maintain permanent position and alignment, I have provided a pivot for swivelly mounting the lenses and the bridge with reference to each other to permit of a flexing action without rupture or strain on the parts. I have also provided such an arrangement through which the temples are connected to the lenses to also assist in absorbing strains of this character. As I do not depend on any resilient arm for supporting the lens, the lenses will not sag or drop in a vertical plane to destroy the desired arrangement of the lenses which is particularly important in cylindrical axis lenses and the bi-focal lenses as is well known; and the following is a detailed description of the present embodiment of this invention illustrating the preferred means by which these advantageous results may be accomplished.

With reference to the drawing, 15 designates a bridge of a generally rigid construction curved as illustrated in Fig. 2 from its central point 16 rearward, then bent at 17 to extend forwardly as at 18 and thence downwardly as at 19 to form arms or posts which are reduced to provide pivots 20 at either end.

A lens holder designated 21 may be either in the form of a strap as illustrated in Figs. 1 to 5 inclusive or may be a lens rim to encircle the lens, and upon this lens holder there is mounted a socket or barrel portion 23 having a bore 24 to receive and be swivelly mounted upon the pivot or bearing 20. This socket is enlarged as at 25 and within this enlarged portion there is a coiled spring 26 encircling the pivot 20 and secured to a projection 27 on the bridge at one end and extending through a hole 28 in the socket and secured to a pin 29 on the lens holder anchoring its other end to the socket. Thus the lens holder is swivelly mounted upon the bridge and is urged about this swivel mounting rearwardly. The swivelling action is limited by means of the pin 27 acting as an abutment and engaging the surface 30 of the lens holder which acts as an abutment surface substantially as illustrated in Fig. 7 to cause the lenses to align in the same plane as shown in Fig. 2.

The end pieces of my improved construction designated generally 32 are formed in two parts, one part 33 being secured by means of the strap, or in any desired manner, to the lens 34 and the other part 35 being provided with spaced ears 36, or some other desired means, to receive and hingedly mount a temple 37 therein in the usual manner. The parts 33 and 35 are swivelly mounted in a manner similar to that above described. A socket portion 38 on the part 33 receives a pivot pin 39 on the part 35 and a spring 40 tends to swing the parts about this pivot or swivel mounting. Part 35 tends to move rearwardly with reference to the lenses and is limited in this swinging movement by a stop pin 41 on the socket part 38 engaging the part 35. The spring ends 42 and 43 are connected respectively to the parts 33 and 35 to anchor them in their desired positions and permit of access thereto for adjustment of the spring to provide the tension desired. By this arrangement a temple, which is usually hingedly mounted to swing to an angle of about 90° and then stop, will be permitted a further swinging movement if a strain is exerted sufficient to overcome the tension of the spring 40 by the swivelling action of the two parts to swing the hinge mounting rather than breaking of the parts which may be caused by such strain.

Nose guards are illustrated at 45 and are secured, in Figs. 1 to 3 inclusive, on the bridge 15 through semirigid arms 46 which may be bent to provide the desired adjustment of these nose pads 45 after which they remain in fixed position on the bridge and act merely as a rest for the mounting on the nose, and as there is no flexing action of the bridge or their supporting arms there is no tendency for them to move or become spread or permit the mounting to settle on the nose.

I have illustrated the swivel mounting which it will be of course apparent may be used on rimless lenses or those with frames, also the swivel mounting may be used either at the bridge side or the temple side of the lenses or in both locations as illustrated in Fig. 1.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In an ophthalmic mounting, a rigid bridge, a pair of nose guard arms rigidly secured to said bridge for permanent adjustment, a pair of lens holders, means for pivotally mounting said lens holders on said bridge about a vertical axis, and resilient means tending to normally hold said lens holders in position desired for visual use.

2. An ophthalmic mounting having in combination a bridge, a pair of nose guard arms rigidly secured to said bridge for permanent adjustment, nose guards on said arms, a pair of lens holders, vertically mounted pivot means whereby the lens holders are freely swiveled with respect to the bridge and the nose guards, and spring means independent of the nose guards yieldingly opposing the swivel movement of the lens holders with respect to the bridge and the guards in one direction of movement.

3. An ophthalmic mounting having in combination a bridge, a pair of nose guard arms rigidly secured to said bridge for permanent adjustment, nose guards on said arms, a pair of lens holders, means whereby the lens holders are freely swiveled about a vertical axis with respect to the bridge and the nose guards and confining the swivel movement of the lens holders in substantially a horizontal plane, and spring means independent of the nose guards yieldingly opposing the swivel movement of the lens holders with respect to the bridge and the guards in one direction of movement.

4. In an ophthalmic mounting, a rigid bridge, a pair of lens holders, means for pivotally mounting said lens holders on said bridge to swing about a substantially vertical axis when the mounting is on the face of the wearer, a pair of nose guards secured to said bridge for permanent adjustment and independent of the swinging movement of the lens holders with reference to said bridge, and resilient means tending to normally hold said lenses in position desired for visual use.

5. In a spectacle, a rigid bridge, nose guards secured to said bridge for permanent adjustment, lens clamps pivoted on said bridge to swing each about a vertical axis, lenses in said lens clamps, temples pivotally secured to said lenses, and resilient means tending to normally hold said lenses in position desired for visual use.

6. In a spectacle, a rigid bridge, a pair of lenses, a pair of temples connected thereto, lens holders, means for pivotally mounting said lens holders on said bridge, spring means encircling said pivotal mounting tending to move said lens holders relative to said bridge inwardly toward the face side of the spectacle, and means at the pivotal mounting to limit the relative inward swinging movement of said lens holders so as to locate the lenses in a predetermined relation desired for visual use.

7. In a spectacle, a rigid bridge having spaced side arms with their ends forming pivots, a pair of lenses, a pair of temples, lens holders provided with sockets to receive said pivots and swingably mount said lens holders on said bridge, a spring engaging each pivot and socket arranged to swing said lens holders inwardly toward the face side of the spectacle, and stop portions provided on said bridge and lens holders and so located for engagement as to align said lenses in a single plane.

8. In an ophthalmic mounting, a bridge having spaced side arms provided with substantially vertical bearing posts at their ends, a pair of lens holders each provided with a tubular socket and each pivotally mounted on one of said posts to swing thereabout, and springs in said tubular sockets to be substantially concealed thereby to swing said lens holders about said posts.

9. In a spectacle, a rigid bridge having spaced side arms with their ends forming pivots, a pair of lenses, a pair of temples, lens holders provided with tubular sockets to receive said pivots and swingably mount said lens holders on said bridge, and a spring substantially within said tubular sockets and engaging each pivot and socket arranged to swing said lens holders inwardly toward the face side of the spectacle.

10. In an ophthalmic mounting, a bridge, a lens, a temple hinge joint, means to swivelly mount said lens about a vertical axis with reference to said bridge, and means to swivelly mount said hinge joint about a vertical axis with reference to said lens.

11. In an ophthalmic mounting, a rigid bridge, a pair of lenses, lens holders secured to said lenses, means for pivotally mounting said lens holders on said bridge to swing about a substantially vertical axis when the mounting is on the face of the wearer, a pair of nose guard arms fixed relative to said bridge and the swinging movement of the lens holders with reference to said bridge nose guards on said arms, temples secured to said lenses for holding said lenses on the face, and resilient means tending to normally hold said lenses in position desired for visual use.

12. An ophthalmic mounting having in combination a bridge, a pair of nose guard arms rigidly secured to said bridge for permanent adjustment, nose guards on said arms, a pair of lens holders, vertical pivot means for mounting the lens holders on the bridge whereby the lens holders are freely swiveled with respect to the bridge and the nose guards, a stop at the swivel mounting to limit the swivel movement of the lens holders in one direction, and spring means urging the swivel movement of the lens holders towards said stop.

13. In a spectacle, a rigid bridge, a pair of nose guard arms rigidly secured to the bridge for permanent adjustment, a pair of lenses, a pair of lens holders, a pin and socket connection, in a vertical plane, between each lens holder and the bridge permitting the lens holders to swing with respect to the bridge in a horizonal plane only, and resilient means tending to normally hold said lenses in position desired for visual use.

14. In a spectacle, a rigid bridge, a pair of nose guard arms rigidly secured to the bridge for permanent adjustment, a pair of lenses, a pair of lens holders, a pin and socket connection between each lens holder and the bridge permitting the lens holders to swing with respect to the bridge in a horizontal plane only, temples secured to the lenses for holding the lenses on the face, and resilient means tending to normally hold said lenses in position desired for visual use.

15. In a spectacle, a rigid bridge, a pair of nose guard arms rigidly secured to the bridge for permanent adjustment, a pair of lenses, a pair of lens holders, a pin and socket connection, in a vertical plane, between each lens holder and the bridge permitting the lens holders to swing with respect to the bridge in a horizontal plane only, a spring engaging each pin and socket arranged to swing said lens holders inwardly towards the face side of the spectacle, and stop portions provided on said bridge and lens holders and so located for engagement as to align said lenses in desired position.

16. In a spectacle as set forth in claim 13, a flange on said pin closing said socket and excluding foreign matter from the socket and resilient means therein contained.

In testimony whereof I affix my signature.

WAYNE S. SEARLES.